United States Patent [19]

Wilson et al.

[11] 4,018,714

[45] Apr. 19, 1977

[54] HYDRODESULFURIZATION CATALYST AND PROCESS FOR PRODUCING THE SAME

[75] Inventors: Geoffrey R. Wilson, Westlake Village; Masami Kayamoto, Whittier, both of Calif.

[73] Assignee: Filtrol Corporation, Los Angeles, Calif.

[22] Filed: Dec. 3, 1975

[21] Appl. No.: 637,363

[52] U.S. Cl. .............................. 252/465; 252/469; 208/216

[51] Int. Cl.² ............... B01J 21/04; B01J 21/06; B01J 23/84; B01J 23/88

[58] Field of Search ............ 252/465, 469; 208/216

[56] References Cited

UNITED STATES PATENTS

| 3,074,893 | 1/1963 | Ellert et al. ...................... 252/465 |
| 3,840,473 | 10/1974 | Beuther et al. ................ 252/465 X |

*Primary Examiner*—W. J. Shine
*Attorney, Agent, or Firm*—Philip Subkow

[57] ABSTRACT

A shaped hydrodesulfurization catalyst comprising a nonzeolitic substrate impregnated with a Group VI and a Group VIII catalytic metal and with a Group IV-B promoter and having a high resistance to abrasion and a process of producing the same employing a substantially nonacid Group IV-B metal compound as the source of the Group IV-B promoter.

19 Claims, No Drawings

HYDRODESULFURIZATION CATALYST AND PROCESS FOR PRODUCING THE SAME

BACKGROUND OF THE INVENTION

This invention relates to catalysts containing the element titanium formed by calcination in air of alumina hydrate which has been impregnated with a titanium compound.

The present invention has been found particularly useful in the preparation of hydro-desulfurization catalysts for the reduction in the sulfur compound content of petroleum oils and fractions thereof.

Such catalysts have been described in U.S. Pat. No. 3,840,473, to which reference may be had for certain of their characteristics.

The catalyst produced by the process disclosed in said patent is a substantially phosphate-free catalyst comprising a hydrogenating component selected from the group consisting of Group VI and Group VIII metals, for example, in the form of oxides and sulfides supported on a nonzeolitic carrier, which catalyst is provided with a minor amount of a Group IV-B metal.

The preferred carrier is as stated in said patent, alumina; other substantially phosphate-free nonzeolitic carriers such as are referred to in said patent may be used. The preferred metallic elements of Group VI metals is stated to be such as molybdenum and tungsten and metals of the iron group, such as cobalt and nickel and the metals of Group IV-B, i.e., titanium, zirconium, or hafnium. The proportions and ratio of the various metallic components are stated in the patent.

The procedure disclosed (see Example 1 of the patent) is a three-step process in which a calcined alumina is treated with an aqueous solution of ammonium paramolybdate in ammonium hydroxide. The treated alumina is dried and then impregnated with an aqueous solution of nickel nitrate. The treated product is then dried and calcined. The calcined product is impregnated with a solution of titanium tetrachloride in n-heptane. The treated product is dried and calcined. The resultant product contained nominally 8% molybdenum, 3% nickel, and 5% titanium, all by weight and based on the total catalyst. For details of the process as disclosed in Example 1, reference is made to the patent.

Commercial hydrodesulfurization catalyst of the Group VI and Group VIII type usually employs a carrier. The carrier as presently employed is a shaped particle herein referred to as a pellet.

Such particles for such purpose in commercial operations in the prior art have been formed of hydrated alumina, and shaped into cylindrical or spherical particles and dried and calcined for impregnation with the Group VI and Group VIII metal compounds.

STATEMENT OF THE INVENTION

We have found that non-acidic solutions of titanium compounds such as organo-metallic titanium compounds used to impregante alumina substrates result in a catalyst which has superior physical strength as measured by resistance to loss by abrasion.

We have found that pellets which have been treated by the procedure of the above patent (Example I), when subjected to abrasion or crushing, disintegrate easily. Such abrasion or crushing may cause serious difficulties if it occurs in the hydrodesulfurization reaction chamber. The fines may result in excessive pressure drop necessitating a unit shutdown and dumping and screening of the catalyst. If the catalyst is excessively abraded, premature replacement will be necessary, resulting in high catalysts costs. The resultant fines may also be discharged from the chamber and introduce mechanical difficulties in downstream equipment. Furthermore, the reduction in the mass of the catalyst in the reactor during the abrasion process decreases the catalyst-to-oil ratio and thus has a deleterious effect on the hydrosulfurization process.

Another disadvantage of such friability arises from the dusting of the catalyst in handling. Not only is there an economic loss in the wasted powdered catalyst but it introduces an additional health and ecological hazard.

We have found that a large increase in the abrasion resistance of the catalyst particle may be obtained when an organo-metallic compound of a Group IV-B metal is substituted for an ionizable salt of a Group IV-B metal such as, for example, a titanium halide, in producing the catalyst from a calcined alumina substrate.

The organo-metallic titanium compounds which may be used in our process include alkoxy titanates (usually referred to as alkyl or aryl titanates $Ti(OR)_4$ where R is, for example $C_1$ to $C_{18}$. They include 2-(ethyl hexyl) titanate, tetra isopropyl titanate $Ti(O\ C_3H_5)_4$, tetra isobutyl titanate $Ti(O\ C_4H_7)_4$, tetrakis (2-ethoxy ethyl) titanate or tetra stearyl titanate $Ti(OC_{18}H_{37})_4$. Tetra isopropyl titanate $Ti(OC_3H_5)_4$ and tetrabutyl titanate $Ti(OC_4H_7)_4$ are preferred since they have higher titanium content than the higher molecular weight homologues, for example, those listed above. Other organo-metallic titanium compounds may be used, titanium chelates may be used, such as are formed from amino alcohols, keto alcohols or glycols or other suitable ligands, for example, acetyl acetonate chelate, triethanol amine chelate and the titanium glycolate chelates, titanium oxalate chelate, glyceryl titanate chelate, and titanium lactate chelate. The titanates referred to above are soluble in the normally used commercial organic solvents, such as the low molecular weight alkyl hydrocarbon solvents, for example, n-heptane, the aromatic solvents, such as benzene, the chlorinated hydrocarbon solvents, such as trichloroethylene and carbon tetrachloride and alcohols. The acetyl-acetonate is soluble in ethyl acetate and isopropyl acetate. The glycolate is also soluble in dioctyl phthalate.

We refer to these solvents as substantially anhydrous organic solvents to distinguish them from water or organic solvent mixtures with substantial quantities of water. Certain of the titanium chelates are water soluble, for example, titanium lactate chelate and titanium triethanol amine chelate. The chemistry, solubility characteristics and physical properties of the above organo titanates are well known.

The foregoing compounds are commercially available, for example, from DuPont de Nemours & Co. under the name "Tyzor" and are described in their advertising brochure "Tyzor Organic Titanates," currently available. Reference is made thereto for a further identification of the titanates and chelates referred to above, and of their chemistry and properties and the solvents which may be used.

While we do not wish to be bound by any theory of why employing the titanium in the form of an organo-metallic compound yields a catalyst of superior quality, the fact that the titanium halide solutions either in aqueous or non-aqueous solvents are acidic and may attack the alumina substrate and weaken its mechanical strength, is consistent with the observed results. Solutions of the organo-metallic titanate which are not acidic, i.e., do not give an acid $p_H$ do not materially affect the mechanical intergrity of the alumina substrate of the catalyst pellet.

STATEMENT OF THE INVENTION

It is, therefore, an object of our invention to produce a hydrodesulfurization catalyst containing metallic elements chosen from the Group VI, Group VIII, for example, in the form of their oxides and containing also metallic elements chosen from the Group IV-B metals, for example, in the form of the oxide, which would have a hardness value; that is, a resistence to abrasion, which is superior to that obtained by treatment of an alumina substrate with an acidic solution of titanium halide such as $TiCl_4$.

It is a further object of our invention to incorporate titanium organo-metallic compounds into an alumina substrate which is also impregnated with compounds of metal chosen from the Group VI and Group VIII metals.

The preferred substrate is alumina produced by calcination of an alumina hydrate and the preferred titanium organo-metallic compound is titanium isopropionate, $Ti(OC_3H_5)_4$.

The alumina hydrate may be produced by calcination of a gelatinous aluminum hydrate and include upwards from about 25% or more gelatinous aluminum monohydrate herein referred to as pseudoboehmite. We prefer to use alumina hydrate which is composed substantially entirely of pseudoboehmite substantially free of crystalline trihydrates, that is it may contain unsubstantial quantities of crystalline trihydrates as described below.

The X-ray pattern of the pseudoboehmite shows a broad peak in the range of 10 A to 18 A, peaking at 13.5 A in a pattern produced from Copper K alpha radiation. (For further details of the composition and crystal structure, see Karl Wafers and Gordon M. Bell Technical Paper No. 19, Alcoa Research Laboratories, 1972, pp. 11 et seq.) The process of Example 1 of U.S. Pat. No. 2,935,463 is reported in said patent to produce a product containing a hydrated alumina gel, identified as boehmite and crystalline aluminum trihydroxides. The gel type of boehmite is here identified as pseudoboehmite and may be used as a substrate in our process and catalyst.

The following examples are illustrations of our invention and are not to be taken as any limitation thereof.

The pseudoboehmite employed in the following examples was formed as described in U.S. Pat. No. 2,935,463 (see Example 1 of the patent) with the following modifications:

The ammonium alum crystals are formed from aluminum sulfate obtained by dissolving gibbsite [$Al(OH)_3$], metallurgical grade, in sulfuric acid. The ammonium alum crystals are exchanged with 28% $NH_3$ in water for 30 minutes at about 100° F. The thickening and washing operation as described in the above patent is carried out at about 140°–180° F. by injection of steam. The alumina is washed to about 2–4% $SO_3$ based on the alumina volatile free basis. The resultant product, according to an X-ray spectogram, is substantially all pseudoboehmite and contains a small fraction, perhaps about 5%, of crystalline trihydroxides such as bayerite, gibbsite or nordstrandite.

The pseudoboehmite is extruded to form pellets in the form of cylinders, for example, from about 5/16-inch to about 1/32-inch nominal diameters, and typically 0.06–0.25 inches long. They are dried at 100°–500° F. and calcined at 800°–1500° F. for 0.1–20 hours.

The alumina resulting from the process of Example 1 is impregnated with Mo and Ni salt, in accordance with the procedures and in the concentration as described below, and then with titanium compound. The impregnated product is calcined. To test the resistance to abrasion of the calcined impregnated catalyst, it is subjected to a test, hereinafter referred to as the "Abrasion Test," as follows:

100 grams of dry catalyst pellets which have been calcined at 800° F. are placed in a standard test cylinder (10% OD and 6% deep) and rotated 33⅓ mins. at 54 RPM. The material is then screened through an appropriate sized screen (for example, a 12-mesh or 32-mesh screen) and the fines passing through the screens are weighed. The abrasion loss as fines is reported as the weight percent of the original sample. This percentage is herein referred to as the "Abrasion Index."

The catalyst of our invention is characterized in that it will have an "Abrasion Index" of less than about 10%, and preferably less than about 2 to 3%.

As is described in said U.S. Pat. No. 3,840,473, in our invention the calcined substrate is impregnated with an aqueous solution of a compound of Group VI and Group VIII metallic element to incorporate the Group VIII and Group VI element into the substrate in an atomic weight ratio in the range of about 1 of the Group VIII metal to about 0.3 to about 5 of the Group VI metal. The preferred range is about 1:0.3 to less than 1:2.5, with a ratio of about 1 of the Group VIII metal to less than 1.75 of the Group VI metal preferred. The total of the Group VI and Group VIII metals may be about 5 to about 30% by weight of the catalyst on a volatile free basis. Preferably the total of the Group VI and Group VIII metals is less than about 20% by weight of the catalyst on a volatile free basis.

The preferred Group VI and Group VIII metal elements in our catalyst are molybdenum and tungsten, nickel and cobalt, with nickel and molybdenum preferred.

The Group IV-B metals are used in a weight ratio of about 1% to about 10% of the catalyst on a volatile free basis. Preferably, less than about 8% of the Group IV-B metals are employed. Typical examples of suitable concentrations of metal in the calcined substrate, prior to loss by abrasion, as is illustrated by the following examples, is for about 5 to about 25%, for example, about 5 to 9% of Mo; and about 1 to about 6% of Ni; and about 1 to about 6% Ti, or a total of all of these metal elements in the range of about 5 to about 40% of the weight calculated as metal plus substrate. As produced by our procedure, the catalyst of our invention has an abrasion index less than about 10% and may be less than 2%, for example, 0.5 to about 1.5%.

EXAMPLE 1

The procedure of Example 1 of the U.S. Pat. No. 3,840,473 was followed using the pseudoboehmite extruded into pellets, dried, and calcined as described above.

The resultant catalyst contained 5.18% Mo, 3.01% Ni, and 4.35% Ti by weight based on the entire catalyst and expressed as the metal. The pellets were soft and had little structural integrity.

EXAMPLE 2

Nine hundred eight grams of pseudoboehmite of Example 1 in the form of calcined 1/16-inch pellets were impregnated with 636 ml aqueous solution of ammonium molybdate in $NH_4OH$, obtained by dissolving 144 g of $MoO_3$ in $NH_4OH$. The impregnated material was dried at 250° F. and calcined at 1,000° F. The cooled calcined material was impregnated with 1,105 ml of a water solution of $TiCl_4$ and $Ni(NO_3)_2$, analyzing 100 g TiO and 46g NiO. The resultant pellets were dried at 250° F. and calcined at 1,000° F. for 3 hours. The product analyzed as follows: 7.83% Mo, 2.95% Ni, 5.24% Ti. The pellets were subjected to the above "Abrasion Test."

The fines through the 12-mesh screen were 54.3% (Abrasion Index) by weight of the sample and analyzed 7.95% Mo, 2.82% Ni, and 5.53% Ti.

EXAMPLE 3

The above Example 2 was repeated using only 850 ml. of the above Ni and Ti solution. The resultant product analyzed 7.74% Mo, 2.89% Ni, and 5.44% Ti.

When subjected to the above "Abrasion Test," 86.5% (Abrasion Index) passed the 12-mesh screen; and the fines analyzed 7.79% Mo, 2.93% Ni, and 5.56% Ti.

EXAMPLE 4

The calcined pellets of pseudoboehmite of Example 2 were impregnated with the molybdenum as described in Example 3 and dried at 250° F. The Ni was added by impregnating the dried Mo containing alumina with 572 ml. of nickel nitrate, analyzing as 46 grams of NiO. It was dried at 250° F. and calcined at 1000° F.

The cooled calcined NiMo-alumina was treated with a solution of 658 ml. of tetraisopropyl titanate in 693 ml. of trichloroethylene. The resultant catalyst was dried at 250° F. and calcined at 1000° F.

The resultant product analyzed 8.10% Mo, 2.91% Ni, and 5.96% Ti.

It was subject to the above abrasion test. The part passing the 12-mesh screen was 1.7% (Abrasion Index) of the sample. It analyzed 8.39% Mo, 3.17% Ni, and 6.50% Ti.

EXAMPLE 5

Eight thousand nine hundred and seventy-seven grams of the above calcined pseudoboehmite in the form of 1/32-inch pellets produced as described above were treated with 6,700 grams of ammonium molybdate, analyzing 1,362 g. $MoO_3$. The resultant product was dried at 250° F. The dried and cooled product was treated with 5,800 grams of $Ni(NO_3)_2$ solution containing 432 g. NiO and dried at 250° F. and calcined at 1000° F. for 3 hours. A 1,777-gram portion of the cooled product was treated with 889 ml. $TiCl_4$ water solution expressed as containing 160 grams of $TiO_2$. The material was dried in a steam chest and calcined at 1000° F.

The resultant product contained 7.26% Mo, 2.86% Ni, and 5.08% Ti.

It was subjected to the above abrasion test. The portion passing a 32-mesh screen was 31% (Abrasion Index). The fines analyzed 7.42% Mo, 2.94% Ni, and 6.39% Ti.

EXAMPLE 6

The procedure of Example 5 was repeated, using tetraisopropyl titanate in a trichloroethylene solution instead of $TiCl_4$ water solution. The cooled calcined NiMo alumina (18,000 g.) thus produced were treated with a solution of 21,950 ml tetraisopropyl titanate in trichloroethylene, analyzing as 2,475 g of $TiO_2$. The resultant catalyst was dried at 250° F. and calcined at 1,000° F.

The resultant product analyzed 7.4% Mo, 3.2% Ni, and 4.8% Ti.

It was subjected to the above abrasion test. The portion passing the 32-mesh was 0.5% (Abrasion Index) of the sample. The fines analyzed 8.45% Mo, 3.95% Ni, and 5.02% Ti.

EXAMPLE 7

100 g of nickel molybdenum-alumina of Example 6 were impregnated with a solution of 55 ml (66.5 g) of titanium lactate chelate and 68 ml of water. The impregnated pellets contained a concentration of Ni, Mo, and Ti similar to the pellets of Example 6. The mixture was evaporated with mixing at 176° F. for 2 hours and for a further hour at 250° F. The extrudates were calcined for 2 hours at 1,000° F. The abrasion loss (Abrasion Index) was 1.0%.

EXAMPLE 8

The procedure of Example 7 was repeated but using 63 ml (66.5 g) of triethanolamine chelate and 60 ml of water. The concentration Ni, Mo and Ti was as in the previous example. The Abrasion Index was 1.3%.

The results of the above examples are stated in the following table:

TABLE I

| Ex. | Ti * Source | Catalyst | | | Abras. Index | | Fines | | |
|---|---|---|---|---|---|---|---|---|---|
| | | % Mo | % Ni | % Ti | % | Screen | % Mo | % Ni | %Ti |
| 1 | $TiCl_4$ | 5.18 | 3.01 | 4.35 | — | — | — | — | — |
| 2 | $TiCl_4$ | 7.83 | 2.95 | 5.24 | 54.3 | 12 | 7.95 | 2.82 | 5.53 |
| 3 | $TiCl_4$ | 7.74 | 2.89 | 5.44 | 86.5 | 12 | 7.79 | 2.93 | 5.56 |
| 4 | TiPT | 8.10 | 2.91 | 5.69 | 1.7 | 12 | 8.39 | 3.17 | 6.50 |
| 5 | $TiCl_4$ | 7.26 | 2.86 | 5.08 | 31.0 | 32 | 7.42 | 2.94 | 6.39 |
| 6 | TiPT | 7.4 | 3.2 | 4.8 | 0.5 | 32 | 8.45 | 3.95 | 5.02 |
| 7 | TiL | — | — | — | 1.0 | 32 | — | — | — |
| 8 | TiTrA | — | — | — | 1.3 | 32 | — | — | — |

* $TiCl_4$ = Titanium Tetrachloride
TiPT = Tetraisopropyl Titanate
TiL = Titanium Lactate Chelate
TiTrA = Titanium Triethanolamine Chelate It will be seen that the pellets formed by using the organo-metallic titanium produced a much more abrasion-resistant particle than was produced by using the titanium tetrachloride. Compare Examples 2 and 3 with Example 4 and Example 5 with Examples 6, 7, and 8. The decrease in the Abrasion Index and in the loss, resulting from the use of the nonacidic titanium compound in the form of an organo-metallic compound, is strikingly evident.

The catalysts of improved abrasion resistance have a desirable activity in hydrodesulfurization operations. The following examples illustrate their activity.

The catalysts prepared as above were subjected to a standard hydrodesulfurization process employing Kuwait Vacuum Gas oil having the following properties: API gravity 22.5; nitrogen 714 ppm; S st % 2.86, API Distillation 10% at 740° F.; 50% at 852° F.; End Point at 940° F. 100 ml of the oil was passed through the catalyst with hydrogen at 400 psig at a hydrogen gas rate of 1500 standard cubic feet per barrel of gas oil (SCF Bbl), and at liquid hourly space velocity (LHSV), i.e., volume of feed passed per volume of catalyst in the reactor, temperatures as indicated below in Table II, with the results as shown in said Table. The weight percent of the sulfur in the treated oil and the weight % reduction is shown in Table II.

TABLE II

| Catalyst of Example | Weight of Catalyst (Grams) | Temperature ° F. | LHSV | % S | Change S% |
|---|---|---|---|---|---|
| 4 | 71.1 | 700 | 1 | 0.37 | 87.4 |
| 4 | 71.1 | 700 | 2 | 0.60 | 79.0 |
| 6 | 70.5 | 700 | 2 | 0.48 | 83.2 |
| 6 | 70.5 | 750 | 2 | 0.28 | 92.0 |

The results described above (see Tables I and II) show that the catalyst produced by employing a substantially nonacidic titanium compound in place of an acid solution of titanium chloride produced an active desulfurizing catalyst of superior hardness. The hardness value of the catalyst of our invention is of an order to produce a practical catalyst of superior hardness which will have improved performance in catalytic process, such as desulfurization. The catalyst, because of its resistance to abrasion, maintains its volume, thus permitting the maintenance of the LHSV. Since the reduction of S decreases with increasing LHSV, the reduction in volume of the catalyst in the reactor by loss of fines due to attrition, at a constant feed rate and temperature, reduces the effectiveness of the catalyst.

The catalyst of our invention has the improved properties resulting from the introduction of the Group IV-B metal, for example, titanium, as in such prior art catalysts. The catalyst is further improved in performance in that its catalytic stability is improved because of the improved volumetric stability in the reactor resulting from its improved abrasion resistance.

Thus, not only is the catalyst improved in that loss of fines of the catalyst is minimized and an economic gain is obtained and ecological hazards mitigated, but also the catalyst of improved hardness results in an improvement in the catalytic process in which it may be used.

We claim:

1. A catalyst consisting essentially of a substrate containing from about 5 to about 40% by weight of the total weight of Group VIII metal oxide and an oxide of a metal selected from the group consisting of molybdenum and tungsten, expressed as the metal, with the atomic weight ratio of Group VIII metal to molybdenum or tungsten being from about 1:0.3 to about 1:2.5 supported on a non-zeolitic refractory oxide carrier, and promoted with from about 1 to about 10% by weight of an oxide of a Group IV-B metal expressed as metal, all based on the weight of metal element plus the weight of said pellet substrate, said catalyst being in pellet form and having an Abrasion Index of less than about 10%.

2. The catalyst of claim 1 in which the substrate is alumina.

3. The catalyst of claim 2 in which the alumina is calcined alumina hydrate comprising 25% or more by weight of pseudoboehmite.

4. The catalyst of claim 3 in which the alumina is calcined alumina hydrate substantially free of crystalline trihydrate.

5. The catalyst of claim 1 in which the Group VI and Group VIII metals are Ni and Mo and the Group IV-B metal is titanium.

6. The catalyst of claim 5 in which the nonzeolitic substrate is alumina.

7. The catalyst of claim 5 in which the nonzeolitic substrate is pseudoboehmite, substantially free of crystalline trihydrate.

8. The catalyst of claim 7 in which the catalyst contains from about 5 to about 25% of Mo and from about 1 to about 6% of Ni and from about 1 to about 6% of Ti weight percent of the substrate plus the metal element, on a volatile free basis.

9. The process of producing a catalyst consisting essentially of alumina containing hydrogenating components of Group VIII metal oxide and an oxide of a metal selected from the group consisting of molybdenum and tungsten which comprises the steps of impregnating pellets of alumina with a solution of the salts of said metals, drying and calcining said impregnated pellets, contacting said pellets with a non-acidic solution of a Group IV-B metal compound selected from the group consisting of IV-B metal chelate and Me-(OR)$_4$ where Me is a IV-B metal and R is $C_1$ to $C_8$ to impregnate said solution into said substrate to introduce from about 1 to about 10% by weight of the said metal compound, expressed as the metal, and based on the weight of metal plus the substrate on a volatile free basis and subjecting said impregnated substrate to an elevated temperature to dry and calcine said substrate.

10. The process of claim 9 in which the compound is a titanate having the formula Ti(OR)$_4$ in which R is an alkyl or aryl $C_1$ to $C_{18}$ radical or a titanium chelate.

11. The process of claim 10 in which the titanate is tetraisopropyl titanate or tetrabutyl titanate.

12. The process of claim 10 in which the compound is a titanium chelate.

13. The process of claim 12 in which the chelate is chosen from the group of titanium chelates consisting of acetyl acetonate chelate, triethanol amine chelate, glycolate chelate, oxalate chelate, lactate chelate, and glyceryl chelate.

14. The process of claim 10 in which the substrate is pseudoboehmite substantially free of crystalline hydrate and calcined to produce the alumina substrate, treating the said calcined substrate with an aqueous solution of the salts of Mo and of Ni, drying and calcining the impregnated substrate containing the Ni and Mo prior to contacting the pellet with the nonacidic solution of the titanium compound, the impregnation incorporating from about 5 to about 25% of Mo, and from about 1 to about 6% of Ni, and from about 4 to about 6% of Ti, weight percent of the catalyst on a volatile free basis.

15. The process of claim 14 in which the titanium compound is an organo-metallic aryl or alkyl titanate Ti(OR)$_4$ chosen from the group consisting of 2-(ethyl hexyl) titanate, tetra isopropyl titanate, tetraisobutyl titanate, tetrakis (2-ethoxy ethyl) titanate, and tetra stearyl titanate.

16. The process of claim 14 in which the titanium compound is a titanium chelate.

17. The process of claim 16 in which the titanium chelate is chosen from the group consisting of acetyl acetonate chelate, triethanol amine chelate, glycolate chelate, oxalate chelate, lactate chelate, and glyceryl chelate.

18. The process of claim 9 in which Me is titanium.

19. The process of claim 9 in which the IV-B metal is titanium.

* * * * *